3,141,503
PLUGGING OF PERMEABLE EARTH FORMATIONS

Nathan Stein, Dallas, Tex., assignor to Socony Mobil Oil Company, Inc., a corporation of New York
No Drawing. Filed Feb. 5, 1960, Ser. No. 6,857
14 Claims. (Cl. 166—29)

This invention relates to the treatment of permeable earth formations and relates more particularly to the plugging of permeable earth formations to reduce the permeability of the formations to the passage of fluids.

For various purposes, well boreholes are drilled from the surface of the earth through the underlying earth strata or formations. Many of the earth formations are permeable to the flow of fluids and are capable of producing fluid into the well borehole. In certain instances this production or flow of fluid into the well borehole from an earth formation is the result intended to be achieved by the drilling of the well borehole. However, in other instances, the flow of fluid, or the flow of one fluid rather than another fluid, into the well borehole, is unwanted. Thus, for example, it may be desired that no fluid flows into the well borehole but a fluid or fluids will enter the well borehole from a permeable formation. Further, for example, two fluids may flow into the well borehole but it is desired that only one of these fluids enters the well borehole. Accordingly, in carrying out various operations within a well borehole, it may become necessary or desirable to plug a permeable formation penetrated by the well borehole to reduce to a greater or lesser extent the flow of fluid from the formation into the well borehole. In connection with various other operations to be performed in a well borehole or in connection with operations on an earthen surface or within the earth, it may become necessary or desirable to plug a permeable earth formation to reduce the passage of fluid therethrough.

It is an object of this invention to reduce the permeability of an earth formation to the passage of a fluid. It is another object of this invention to provide a procedure for reducing the permeability of an earth formation penetrated by a well borehole. It is another object of this invention to reduce flow of fluid into a well borehole from a permeable formation. It is another object of this invention to reduce the flow of a particular fluid into a well borehole from a permeable formation. It is another object of this invention to reduce the flow of fluid from a particular formation into a well borehole. Further objects of the invention will become apparent from the following detailed description.

In accordance with the invention, there is provided a procedure for treating a permeable earth formation comprising introducing into the formation an ester of titanium and contacting the ester within the formation with water.

By the procedure of the invention, plugging of a permeable earth formation to a greater or lesser extent is effected. While I do not wish my invention to be limited to the consequences of any theory, it is believed that the plugging action is obtained as a result of hydrolysis of the ester of titanium. Esters of titanium are susceptible to hydrolysis upon contact with water. The ultimate hydrolysis product is titanium dioxide. The titanium dioxide obtained as the hydrolysis product is an amorphous, gelatinous material having tenacity for the walls of the interstices within permeable earth formations. The ester of titanium upon introduction into the permeable formation contacts the water therein and the hydrolysis reaction between the ester of titanium and the water takes place within the interstices of the formation. Thus, the formation will contain the gelatinous, tenacious hydrolysis product within its interstices. The product adheres to the walls of the interstices of the formation and is capable of resisting displacement from the interstices by fluid pressure. Thus, the permeability of the formation to the flow of fluids is reduced. Depending upon the amount of hydrolysis product formed per unit pore volume of the formation and the fluid pressure differential, a greater or lesser, as desired, reduction in permeability, or plugging, of the formation is effected.

The procedure of the invention may be employed for plugging permeable formations to the passage of either gas or liquid. The fluid whose passage through the permeable formation is to be reduced may be oil or may be water or may be a mixture of oil and water. Where the fluid whose passage through the formation to be treated is gas or oil, the formation may or may not contain sufficient connate, or natural, water to react with the ester of titanium to effect the hydrolysis reaction. Where the amount of connate water is insufficient to effect the hydrolysis reaction, a step of providing water to the formation is carried out. This is effected by introducing water into the formation prior to introducing the ester of titanium into the formation. The water may also be introduced subsequent to introducing the ester of titanium. On the other hand, where the formation is producing water or otherwise contains sufficient water to effect the hydrolysis reaction, the step of introducing water will not be required.

Plugging of a permeable formation by the procedure of the invention may be carried out in connection with various well operations. For example, the process of the invention may be employed in connection with the drilling of the well borehole. Recently, the use of gas in the drilling of wells has been found, depending upon conditions of pressure of the formation fluids, to be preferable to the more conventional use of liquid drilling fluids. In gas drilling, a gas, which may be air, is pumped to the bottom of the well borehole during the drilling operations. The gas is under high pressure and, as it passes over the drill bit and flows upwardly through the well borehole at high velocity, carries the cuttings with it. However, gas drilling is subject to hindrance where water flows into the well borehole from a permeable formation. The water flowing into the well borehole wets the cuttings causing them to ball up and thereby prevents their movement along with the gas upwardly through the well borehole. Ordinarily, with small amounts of water entering the well borehole, the cuttings can be removed from the well borehole by introducing a surfactant along with the gas to the well borehole. The surfactant apparently prevents balling of the cuttings and sticking to the drill pipe and walls of the well borehole. With greater amounts of water, gas drilling can be continued by adding a foaming agent to the gas. The foaming agent combines with the water to form a foam which is capable of supporting the cuttings. The gas brings the foam to the surface of the earth and the cuttings are carried along with the foam. However, with still greater amounts of water, gas drilling can lose its advantages over conventional drilling employing liquid drilling fluids. A formation can be plugged to the flow of water to the well borehole during gas drilling by the procedure of the invention.

The process of the invention may also be used in connection with the production of petroleum oil or gas into a well borehole. In the production of oil or gas, water occasionally enters the well from a permeable water-containing formation. This water which enters the well has to be removed from the well along with the oil and gas. The separation adds to the cost of producing the oil or gas. Additionally, further costs are encountered in disposing of the separated water. Where water is flowing into an oil or gas well, the formation from which the water is being produced can be treated by introducing into the formation an ester of titanium.

Further, in connection with the production of petroleum oil into a well borehole, a formation productive of gas can be treated to reduce the flow of gas into the formation. In many instances, the production of the gas along with the petroleum oil is undesired. The gas must be separated from the oil and where the gas-oil ratio is high, the cost of equipment required for separation becomes appreciable. Additionally, the separated gas most often must be returned to the producing formation in accordance with compulsory conservation practices which adds to the cost of operation. Where the gas is flowing into a well borehole from a formation other than a formation productive of petroleum oil, the gas productive formation can be treated in accordance with the invention to reduce the flow of gas. Also, where a portion of a formation productive of petroleum oil is productive of gas in undesirably large amounts, the portion of the formation productive of the undesirably large amounts of gas may be treated in accordance with the invention.

The process of the invention may also be employed to reduce flow of fluid into a permeable formation penetrated by a well borehole. In secondary recovery of petroleum oil from a reservoir, various fluids such as gas, normally gaseous hydrocarbons which may be liquid under the conditions at which they are employed, normally liquid hydrocarbons, or water may be injected into the reservoir through an injection well. The injection well may penetrate a permeable formation other than the reservoir into which these fluids may flow. These formations may be treated by the process of the invention to reduce their permeability to the fluids injected through the well borehole. Further, in the drilling of wells employing liquid drilling fluid, the drilling fluid may flow into a permeable formation with consequent loss of the drilling fluid. This loss of drilling fluid, or lost circulation, may be reduced by treatment of the permeable formation, or lost circulation zone, by the process of the invention.

The process of the invention may also be employed in connection with other operations in a well borehole. Casing is often placed within a well borehole in order to provide a fluid-impermeable sheath within the well borehole. To insure positioning, and sealing, of the casing within the formation, cement is ordinarily pumped into the well borehole between the face of the borehole and the outer surface of the casing. Occasionally, gaps occur in the cement between the face of the borehole and the outer surface of the casing and leakage of the fluid from the well borehole through the gaps into a permeable formation may occur. This leakage may be reduced by the process of the invention. Further, holes occasionally develop within the casing as a result of corrosion, or otherwise, with consequent loss of fluid through the casing into a permeable formation. This leakage of fluid through the casing may be reduced by the process of the invention. In these latter two cases, the ester of titanium, and water if required, are introduced through the gaps or holes into the formation. Stated generally, the process of the invention may be employed where passage of fluid through an earth formation is to be reduced. Thus, the invention may also be used for treatment of earth surfaces to prevent seepage of fluid. Thus, for example, earthen pits for the storage of fluids may be treated to prevent seepage of the fluid from the pit into the earth with consequent loss of fluid.

Esters of titanium are liquid phase or solid phase compounds. Where the ester is a liquid phase compound, it can be introduced per se into the formation to be treated. Where the ester is a solid phase compound, however, it must be introduced into the formation in solution in a suitable solvent. Additionally, even where the ester of titanium is a liquid phase compound, it can be unduly viscous, and, in order to avoid difficulty in handling viscous liquids, the ester may be dissolved in a suitable solvent for introduction into the formation.

In the practice of the invention, the formation or portion thereof to be treated can be isolated prior to introduction of the ester of titanium. By isolating the formation or portion thereof to be treated, wastage is avoided by insuring that all of the ester employed enters the formation. Further, entry of the ester into a formation or portion thereof that desirably should not be plugged is avoided. Isolation can be effected, for example, in a well borehole by employing straddle packers, i.e., a packer below the formation and a packer above the formation, and pumping the ester of titanium through tubing or otherwise between the packers. Where the formation or portion thereof to be treated is at the bottom of a well borehole, a single packer may be employed above the formation or portion thereof to be treated and the ester of titanium introduced into the formation below the packer. "Floating" of the ester of titanium can also be employed. In this technique, the well borehole is filled with a liquid to the level of the formation or portion thereof to be treated. A packer is placed in the formation just above the point of treatment and the ester of titanium is pumped into the well borehole below the packer. For "floating," the ester of titanium, or its solution where a solution is employed, is less dense than the liquid which is used to fill the well borehole. As a result, the ester or its solution floats at the top of the body of liquid in the well borehole. Under the pressure employed, the ester or its solution will enter the formation adjacent the top of the body of liquid. "Submarining" of the ester of titanium can also be employed. In this technique, a body of liquid is formed within the well borehole with the formation or portion thereof to be treated at the bottom of the body of liquid. The ester, or its solution where a solution is employed, is more dense than the liquid within the well borehole. As a result, the ester or its solution sinks to the bottom of the body of liquid and under the pressure employed will enter the formation adjacent the bottom of the body of liquid. Another technique which may be employed to introduce the ester into the formation is the so-called "Bradenhead" squeeze.

In introducing the ester of titanium into the formation or portion thereof to be treated, it is desirable to avoid contact of the ester with water except within the formation. With contact of the ester of titanium with water, hydrolysis will begin. Hydrolysis of the ester of titanium within tubing may effect a plugging of the tubing. Hydrolysis of the ester within a well borehole should also be avoided. However, hydrolysis of a small amount of ester within a well borehole will cause no particular plugging difficulty because of the relatively large diameter of the well borehole. On the other hand, hydrolysis of the ester within a well borehole, or elsewhere, represents a waste of the ester, even if the plugging effect is of little consequence. Where the ester is passed through a well borehole, contact of the ester with water other than within the formation to be treated can be minimized by preceding the ester from the surface of the earth to the formation with a body of an inert fluid. Thus, a body, or slug, of inert fluid may first be passed down through tubing or other conduit employed to transfer the ester of titanium from the surface of the earth to the formation. Thus slug of inert fluid will displace any water and force it into the formation. Immediately thereafter, the ester of titanium is passed down the tubing or piping and into the formation. To displace the last portion of the amount of ester employed for any one operation from the tubing or other conduit into the formation, a displacing fluid can be employed. The most economical displacing fluid is water. Water can be employed as the displacing fluid by following the body of ester of titanium with a body, or slug, of inert fluid. In the alternative, the inert fluid may be employed exclusively as the displacing fluid. Of course, where water will be absent from the tubing or other conduit, or water is not employed as a displacing fluid, the use of an inert fluid prior and subsequent, respectively, to the ester of titanium will not be required.

As the inert fluid, any fluid which does not hydrolyze the ester of titanium may be employed. The inert fluid may be a liquid or a gas. Preferably, however, a liquid is employed since a liquid will be more effective from the standpoint of displacing water from the tubing or other conduit. The liquid may be heavier or may be lighter than water. Included among the liquids that may be employed are crude or processed petroleum oil, Diesel oil, kerosene, gas oil, naphtha, and benzene. Other liquids that may be employed include halogenated hydrocarbons such as carbon tetrachloride, and trichlorethane. Other inert liquids include alcohols such as ethanol, isopropanol, butanol, and pentanol.

Where "floating" or "submarining" is employed to introduce the ester of titanium into the formation, the body of liquid within the well borehole may be formed of an inert liquid. However, water may also be employed to form the body of liquid. Hydrolysis of the ester of titanium will begin to occur upon contact with the body of water. However, this hydrolysis will occur only at the interface between the body of water and the ester or solution thereof entering the formation. Accordingly, only a minor portion of the total amount of ester employed will be effected. Further, depending upon the ester employed, the rate of hydrolysis may be sufficiently slow that the hydrolysis will not be complete until after the ester has been introduced into the formation. Thus, the contact of the ester with the body of water in the well borehole will be insignificant from the standpoint of effecting any plugging of the well borehole.

As previously stated, the ester of titanium may be introduced into the formation in solution in a suitable solvent. The solvent may be heavier than water or may be lighter than water. Suitable solvents include hydrocarbon liquids such as pentane, hexane, heptane, crude or processed petroleum oil, Diesel oil, kerosene, gas oil, naphtha, and benzene. Other suitable solvents include alcohols such as ethanol, isopropanol, butanol, and pentanol. Halogenated solvents such as carbon tetrachloride and trichlorethane may also be used. A solvent which has mutual solubility with the ester employed and with water, such as isopropanol, has the advantage of readily merging with water in the formation to cause a more intimate and immediate contact of the water and the ester.

Where a solvent is employed for the ester of titanium, the concentration of ester in the solution can be as desired within the limits of solubility of the particular ester in the particular solvent. However, with solutions containing low concentrations of the ester, the amount of ester can be too low for effective plugging. Satisfactory results have been obtained employing solutions containing a weight ratio of solvent to ester of 30 to 1. However, ordinarily, it is preferred to employ solutions containing higher concentrations of the ester. For example, weight ratios of solvent to ester between 1 to 1 and 20 to 1 are preferably employed selecting a proper ester and a proper solvent to obtain the desired ratio. In this connection, the esters having a small number of carbon atoms are miscible in all proportions in solvents such as ethanol, hexane, benzene, carbon tetrachloride, and Diesel oil. The esters containing larger number of carbon atoms such as those containing about 17 carbon atoms are much less soluble in these solvents.

Various esters of titanium may be employed. These esters are characterized by having the formula $T_i(OR)_4$ wherein at least one —R— is an organic radical containing a carbon atom connected directly to an —O—. The remaining —R's— may be hydrogen. Ordinarily, —R— will be an alkyl group or an acyl group. Further, ordinarily, each of the four —R's— will be the same but this is not essential. The —R— group may contain from one to 17 or more carbon atoms. Typical alkyl esters of titanium that may be employed include tetra isopropyl titanate, tetra n-butyl titanate, tetra 2-ethylhexyl titanate, and tetra stearyl titanate. Other typical esters include hydroxytitanium stearate, isopropoxytitanium stearate, hydroxytitanium oleate, isopropoxytitanium oleate, hydroxytitanium soy acylate, isopropoxytitanium soy acylate, hydroxytitanium linseed acylate, isopropoxytitanium linseed acylate, hydroxytitanium castor acylate, hydroxytitanium tall oil acylate, isopropoxytitanium tall oil acylate, hydroxytitanium cocoanut acylate, and isopropoxytitanium cocoanut acylate. Where the acyl esters are employed, a preliminary or subsequent step of introducing a basic compound into the formation to be treated is required. The basic compound may be a caustic such as sodium hydroxide or may be ammonium hydroxide.

The rate of hydrolysis of the esters of titanium varies with the number of carbon atoms in the —R— group. The esters wherein the —R— group contain two or three carbon atoms hydrolyze rapidly. As the —R— group increases in size, the rate of hydrolysis decreases. Esters containing five to ten carbon atoms in the —R— group are preferred from the standpoint of the rate of hydrolysis.

The amount of ester to be introduced into a formation will vary with the extent to which its permeability is to be reduced, the particular ester employed, the porosity of the formation, and the pressure differential on the fluid within the formation. Accordingly, no general rule can be given concerning the amount of ester to be employed. However, it can be stated that sufficient ester should be employed that the ester will penetrate the formation from its face at the well borehole for a depth of at least one inch. Preferably, the amount employed should be sufficient to effect a depth of penetration of at least three inches. Particularly effective results are obtained where the depth of penetration is at least four, five, or six inches. Greater depths of penetration may also be effected. The amount of ester employed can also be expressed on the basis of the surface area of the formation to be treated. On this basis, the amount of ester to be employed may be between 0.25 and 20 pounds per square foot of surface of the formation. Desirably, between 1 and 15, and more particularly between 2 and 10, pounds of ester per square foot of surface of the formation are employed.

As indicated previously, the rate of hydrolysis of the ester will depend upon the number of carbon atoms in the —R— group. The rate of hydrolysis will also depend upon the temperature at which the reaction occurs. Accordingly, attainment of maximum plugging under the particular circumstances will be a function of time and temperature. To insure attainment of maximum plugging, it is therefore preferred to permit the ester of titanium to remain within the formation for a suitable period of time before carrying out further operations in the well borehole. For example, the ester of titanium may be permitted to remain in the formation for a period of one-half hour or more following introduction thereof before carrying out further operations. Thus, in gas drilling, for example, the ester of titanium should be permitted to remain in the formation for a period of at least one-half hour before beginning drilling operations. Satisfactory results have been obtained with a waiting period of two hours. Of course, greater waiting periods can also be employed.

Introduction of the ester of titanium into the formation can be effected by imposing a suitable pressure upon the ester. This pressure may be the hydrostatic head of the column of ester, and any displacing fluid, in tubing or other conduit. Ordinarily, however, a greater pressure than the hydrostatic pressure will be required in order to introduce the ester into the formation. Where water is introduced into the formation as a preliminary or subsequent step to introducing the ester, a greater pressure than the hydrostatic pressure will also ordinarily be required to effect penetration of the water into the formation. Pressure may be imposed employing any suitable type of pump or other pressuring apparatus. It is desirable, where pressuring is employed to introduce the liquid into the formation, to avoid imposing pressures upon the formation sufficiently high to effect fracturing of the formation. Fractures can be plugged by the procedure of the invention. However, the creation of a fracture will increase the permeability of the formation being treated and adds to the degree of treatment required.

The following examples will be further illustrative of the invention.

*Example I*

In the drilling of a well employing air to remove the cuttings from the well borehole, water began to enter the well borehole when a depth of 890 feet was attained. The well borehole had a diameter of 13¾ inches. Air drilling was continued beyond the 890-foot depth and the air during this drilling carried between 10 and 15 barrels of water per hour out of the well borehole along with the cuttings.

Upon attaining a depth of 1202 feet, it was decided to plug the water-producing formation. This water-producing formation was a porous dolomite formation and extended over the 890–912 foot interval. Drilling was stopped and a packer was set in the well borehole at a depth of 810 feet around the bottom of the drill pipe. The open borehole below the packer was filled with water. The drill pipe was then filled with Diesel oil, 15 barrels of the oil being used. A pressure of 300 pounds per square inch was imposed upon the oil within the drill pipe to determine if introduction of fluid into the water-producing formation could be effected below its fracturing pressure. Introduction of fluid was readily affected at the pressure employed. Following this test, a layer of Diesel oil was present below the packer within the well borehole and imposition of the pressure on the Diesel oil in the drill pipe had resulted in introduction of water into the formation.

A solution was prepared by mixing 160 gallons of tetra 2-ethylhexyl titanate having a density of 1.07 at 25° C. with 440 gallons of Diesel oil. This solution of titanium ester and Diesel oil was then pumped through the drill pipe at a pressure of 300 pounds per square inch. The solution of ester was followed with two barrels of Diesel oil as a spacer and then with water to displace the solution from the drill pipe and insure that the entire amount of solution entered the formation. The solution entered the body of water below the packer and flowed from the body of water into the formation. The total amount of Diesel oil introduced into the formation was 1154 gallons and included the oil used to fill the drill pipe, the oil used to make up the solution, and the oil used as a spacer. The ratio of oil to ester introduced into the formation was thus 1154 gallons to 160 gallons. The Diesel oil had a density of about 0.86 at 25° C.

Thereafter, pressure was maintained on the water in the drill pipe to prevent movement of fluid into or out of the porous formation. After a waiting, or shut-in, period of two hours, the pressure on the water in the drill pipe was released and the packer was removed from the well borehole. Air was injected into the open well borehole and the liquid within the hole was blown out. Drilling was then continued. After drilling 10 feet of new hole, the cuttings removed from the well borehole by the air were completely dry. Drilling was thereafter continued without any further flow of water into the well borehole from the treated porous dolomite formation.

*Example II*

A 6¾ inch diameter well borehole was being drilled employing air drilling. At a depth of 8,251 feet, water began to enter the well borehole. At a depth of 8,351 feet, with water entering the well borehole over the interval from 8,251 feet, the water flow into the well borehole was sufficiently great to warrant plugging of the entire 100-foot interval. It was believed that this interval contained a fracture.

An inflatable packer was set at the 8,251-foot depth at the bottom of the drill pipe. Four barrels of diesel oil were pumped through the drill pipe to fill the lower 100 feet of the well borehole with the oil. Pressure was applied to the diesel oil to determine if fluid could be introduced into the formation below fracturing pressure and flow of the oil into the permeable formation below fracturing pressure was effected. A solution was prepared by mixing 378 gallons of diesel oil with 40 gallons of tetra 2-ethylhexyl titanate having a density of 1.07 at 25° C. This solution was pumped at a pressure of 3200 pounds per square inch through the drill pipe to the bottom of the well and into the permeable formation. The solution was followed with two barrels of diesel oil as a spacer after which water was pumped into the drill pipe. The total amount of diesel oil introduced into the solution was 630 gallons and the ratio of oil to ester introduced into the formation was then 630 gallons to 40 gallons. Pressure was thereafter maintained on the fluid in the drill pipe to prevent movement into or out of the formation for a period of 45 minutes.

After the shut-in period, the packer was removed from the well borehole. A bit was placed at the end of the drill pipe and air was blown through the drill pipe to displace the liquid from the bottom of the well borehole. Following removal of the liquid, drilling was continued and shortly thereafter the cuttings removed from the well borehole by the air were dry. The well was completed without further water flow from the treated formation.

Having thus described my invention, it will be understood that such description has been given by way of illustration and example and not by way of limitation, reference for the latter purposes being had to the appended claims.

I claim:

1. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:
    (a) introducing into said formation an ester of titanium,
    (b) maintaining said ester of titanium within said formation for a period which is at least one-half hour, and
    (c) forming by reaction of said ester of titanium with said water within said formation an amorphous, gelatinous precipitate within said formation which restricts flow of water from said formation into said well borehole.

2. The process of claim 1 wherein said ester of titanium in tetra 2-ethylhexyl titanate.

3. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:
    (a) placing packer means within said well borehole to isolate a vertical section of said well borehole including said formation from the remainder thhereof,
    (b) introducing a liquid containing an ester of titanium into said isolated vertical section of said well borehole,
    (c) applying sufficient pressure to said liquid in said isolated vertical section of said well borehole to introduce said ester of titanium into said formation, (d) maintaining said ester of titanium within said formation for a period which is at least one-half hour, and (e) forming by reaction of said ester of titanium with said water within said formation an amorphous, gelatinous precipitate within said formation which restricts flow of water from said formation into said well borehole.

4. The process of claim 3 wherein said ester of titanium is tetra 2-ethylhexyl titanate.

5. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:

(a) placing packer means within said well borehole to isolate a vertical section of said well borehole including said formation from the remainder thereof with said formation being at the upper portion of said isolated vertical section, (b) introducing a liquid inert to an ester of titanium into said isolated vertical section of said well borehole, (c) introducing a liquid containing an ester of titanium, said liquid having a lesser density than said liquid introduced into said isolated vertical section of well bore in step (b), into said isolated vertical section of said well borehole, whereby said liquid containing said ester of titanium floats upon said liquid, (d) applying sufficient pressure to said liquids in said isolated vertical section of said well borehole to introduce said ester of titanium into said formation, (e) maintaining said ester of titanium within said formation for a period which is at least one-half hour, and (f) forming by reaction of said ester of titanium with said water within said formation an amorphous, gelatinous precipitate within said formation which restricts flow of water from said formation into said well borehole.

6. The process of claim 5 wherein said ester of titanium is tetra 2-ethylhexyl titanate.

7. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:

(a) placing packer means within said well borehole to isolate a vertical section of said well borehole including said formation from the remainder thereof with said formation being at the upper portion of said isolated vertical section, (b) introducing water into said isolated vertical section of said well borehole, (c) introducing a liquid inert to an ester of titanium and of less density than water into said isolated vertical section of said well borehole whereby said liquid inert to an ester of titanium floats upon said water, (d) introducing a liquid containing an ester of titanium, said liquid having a lesser density than said liquid introduced into said well borehole in step (c), into said isolated vertical section of said well borehole whereby said liquid containing said ester of titanium floats upon said liquid introduced into said isolated vertical section of said well borehole in step (c), (e) applying sufficient pressure to said liquids in said isolated vertical section of said well borehole to introduce said ester of titanium into said formation, (f) maintaining said ester of titanium within said formation for a period which is at least one-half hour, and (g) forming by reaction of said ester of titanium with said water within said formation an amorphous, gelatinous precipitate within said formation which restricts flow of water from said formation into said well borehole.

8. The process of claim 7 wherein said ester of titanium is tetra 2-ethylhexyl titanate.

9. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:

(a) placing packer means within said well borehole to isolate a vertical section of said well borehole including said formation from the remainder thereof with said formation being at the upper portion of said isolated vertical section, (b) introducing a liquid containing an ester of titanium into said isolated vertical section of said well borehole in quantity sufficient to fill said isolated vertical section of said well borehole, (c) imposing a column of a liquid inert to said ester of titanium upon said liquid containing said ester of titanium within said isolated vertical section of said well borehole, (d) imposing a column of water upon said column of liquid inert to said ester of titanium, (e) applying sufficient pressure through said column of water and said column of liquid inert to said ester of titanium to said liquid in said isolated vertical section of said well borehole to introduce said ester of titanium into said formation, (f) maintaining said ester of titanium within said formation for a period which is at least one-half hour, and (g) forming by reaction of said ester of titanium with said water within said formation an amorphous, gelatinous precipitate within said formation which restricts flow of water from said formation into said well borehole.

10. The process of claim 9 wherein said ester of titanium is tetra 2-ethylhexyl titanate.

11. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:

(a) placing packer means within said well borehole to isolate a vertical section of said well borehole including said formation from the remainder thereof with said formation being at the lower portion of said isolated vertical section, (b) introducing a liquid inert to an ester of titanium into said isolated vertical section of said well borehole, (c) introducing a liquid containing an ester of titanium, said liquid having a greater density than said liquid introduced into said well borehole in step (b), into said isolated vertical section of said well borehole whereby said liquid containing said ester of titanium sinks below said liquid, (d) applying sufficient pressure to said liquids in said isolated vertical section of said well borehole to introduce said ester of titanium into said formation, (e) maintaining said ester of titanium within said formation for a period which is at least one-half hour, and (f) forming by reaction by said ester of titanium with said water within said formation an amorphous, gelatinous precipitate within said formation which restricts flow of water from said formation into said well borehole.

12. The process of claim 11 wherein said ester of titanium is tetra 2-ethylhexyl titanate.

13. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:

(a) placing packer means within said well borehole to isolate a vertical section of said well borehole including said formation from the remainder thereof with said formation being at the upper portion of said isolated vertical section, (b) introducing water into said isolated vertical section of said well borehole, (c) introducing an oil into said isolated vertical section of said well borehole in quantity such that said water and said oil fill said isolated vertical section of said well borehole, said oil having a lesser density than water, whereby said oil floats upon said water, (d) introducing a liquid containing tetra 2-ethylhexyl titanate, said liquid having a lesser density than said oil introduced into said well borehole in step (c), into said isolated vertical section of said well borehole whereby said liquid containing said tetra 2-ethylhexyl titanate will float upon said oil introduced into said isolated vertical section of said well borehole in step (c), (e) imposing a column of oil upon said liquid containing said tetra 2-ethylhexyl titanate, (f) imposing a column of water upon said column of oil, (g) applying sufficient pressure through said column of water and said column of oil to introduce said tetra 2-ethylhexyl titanate into said formation, (h) maintaining said tetra 2-ethylhexyl titanate within said formation for a period which is at least one-half hour, and (i) forming by reaction of said tetra 2-ethylhexyl titanate with said water within said formation an amorphous, gelatinous precipitate within said formation which restricts flow of water from said formation into said well borehole.

14. In a process for the drilling of a well borehole into the earth wherein cuttings are removed from said well borehole during drilling by pumping a gas under pressure to the bottom of said well borehole and thence upwardly through said well borehole to the surface of the earth and water within a permeable formation flows into said well borehole from said formation and interferes with the removal of said cuttings from said well borehole, the process for reducing the flow of said water into said well borehole from said formation comprising the steps of:

(a) placing packer means within said well borehole to isolate a vertical section of said well borehole including said formation from the remainder thereof with said formation being at the upper portion of said vertical section, (b) introducing oil into said isolated vertical section of said well borehole in quantity such that said oil fills said isolated vertical section of said well borehole, (c) introducing a liquid containing tetra 2-ethylhexyl titanate into said isolated vertical section of said well borehole, said liquid having a lesser density than said oil introduced into said well borehole in step (b), whereby said liquid containing said tetra 2-ethylhexyl titanate will float upon said oil, (d) imposing a column of oil upon said liquid containing said tetra 2-ethylhexyl titanate.

(e) imposing a column of water upon said column of oil, (f) applying sufficient pressure through said column of water and said column of oil to introduce said tetra 2-ethylhexyl titanate into said formation, (g) maintaining said tetra 2-ethylhexyl titanate within said formation for a period which is at least one-half hour, and (h) forming by reaction of said tetra 2-ethylhexyl titanate with said water within said formation an amorphous, gelatinous precipitate within said formation which restricts flow of water from said formation into said well borehole.

References Cited in the file of this patent

UNITED STATES PATENTS

| | | |
|---|---|---|
| 2,019,908 | Kennedy et al. | Nov. 5, 1935 |
| 2,259,875 | Bent et al. | Oct. 21, 1941 |
| 2,270,006 | Kennedy | Jan. 13, 1942 |
| 2,579,414 | Boyd | Dec. 18, 1951 |
| 2,867,278 | Mallory et al. | Jan. 6, 1959 |
| 2,889,883 | Sautora | June 9, 1959 |

UNITED STATES PATENT OFFICE
CERTIFICATE OF CORRECTION

Patent No. 3,141,503                          July 21, 1964

Nathan Stein

It is hereby certified that error appears in the above numbered patent requiring correction and that the said Letters Patent should read as corrected below.

Column 4, line 62, for "Thus" read -- This --; column 7, line 13, for "emplying" read -- employing --; column 8, line 70, for "thhereof" read -- thereof --; column 9, line 32, for "bore" read -- borehole --.

Signed and sealed this 24th day of November 1964.

(SEAL)
Attest:

ERNEST W. SWIDER                          EDWARD J. BRENNER
Attesting Officer                            Commissioner of Patents